(12) United States Patent
Chang

(10) Patent No.: US 6,547,069 B2
(45) Date of Patent: Apr. 15, 2003

(54) SNAPPING MECHANISM OF A CD CASE

(75) Inventor: Hsing-Chiou Chang, Chang Hwa Hsien (TW)

(73) Assignee: SNYR YIH Metallic Co., Ltd., Chang Hwa Hsien (TW)

(*) Notice: Subject to any disclaimer, the term of this patent is extended or adjusted under 35 U.S.C. 154(b) by 58 days.

(21) Appl. No.: 09/930,235

(22) Filed: Aug. 16, 2001

(65) Prior Publication Data

US 2003/0034260 A1 Feb. 20, 2003

(51) Int. Cl.[7] .................................................. B65D 85/57
(52) U.S. Cl. ......................................... 206/310; 206/308.1
(58) Field of Search ............................. 206/308.1, 311, 206/312, 387.13, 472

(56) References Cited

U.S. PATENT DOCUMENTS 6,237,763 B1 * 5/2001 Lau .......................... 206/308.1
6,398,022 B1 * 6/2002 Mou et al. ................. 206/308.1
2002/0100701 A1 * 8/2002 Chiu ........................ 206/308.1

* cited by examiner

Primary Examiner—David T. Fidei
(74) Attorney, Agent, or Firm—Rosenberg, Klein & Lee

(57) ABSTRACT

A snapping mechanism of a CD case, wherein, a short conic support area extending from the bottom of the case having at its center protruding a short cylindrical snapping member; a guiding concave and a conic guiding area respectively provided on top of and on circumference of the snapping member; individual snapping bulge provided beneath the conic guiding area; both the snapping member and the support area are equally divided into multiple sections by grooves for each section to be segregated into an elastic snapping panel, and a hollow channel provided to each of the snapping panels at where the snapping member connected to the support area for each elastic snapping panel and the support area to be connected by a trail.

4 Claims, 10 Drawing Sheets

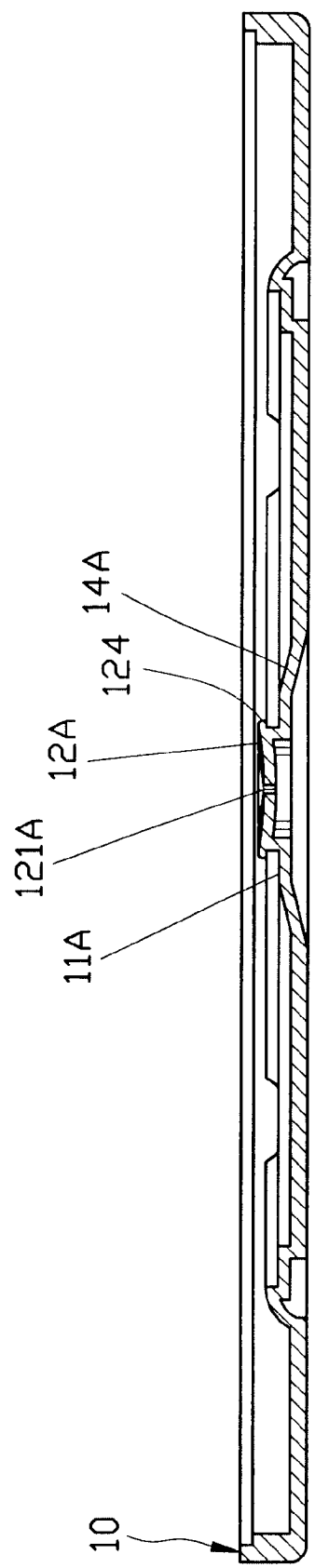
FIG.7 7-7

SNAPPING MECHANISM OF A CD CASE

BACKGROUND OF THE INVENTION (a) Field of the Invention

The present invention related to a snapping mechanism of a CD case, and more particularly, to one having a snapping bulge or a snapping flange on the upper edge or in its proximity to improve, secured snapping, and a hollow channel provided at where a snapping member connected to its support area to increase transformation amount when the snap member being under pressure to facilitate operating and increasing the number of the snapping bulge or the snapping flange.

(b) Description of the Prior Art

As illustrated in FIGS. 1 and 1A, a snapping mechanism of a CD case has a two-gradation snap member (2) provided at the center of the base (1) of the CD case. Multiple force guiding gaps (4) in stripe shape extend from the center of the snap member (2) at equal spacing to form multiple winding force guiding panels (3) and in the proximity of the center of the base (1) multiple stripe gaps (8) are provided at equal spacing to form support arms (6) of same quantity with certain parts of those gaps (8) connected to those gaps (4) of the snap member (2). A slop (5) from the outer circumference of the force guiding panel (3) is connected to the upper edge of a snap area (7) while the lower edge connected to two support arms (6) so that the support arm (6), the snap area (7) connected to it and the force guiding panel (3) are provided with elasticity subject to the compression towards the center.

Upon placing a CD in the base, insert the hole in the center of CD down to the slope (5) on the outer circumference of the force guiding panel (3) for the snap area (7) of the force guiding panel (3) to be restricted in the circumference of the center hole in the CD.

To fetch the CD, use a finger to press the center on the top of the snap member (2) for each force guiding panel to transform due to elasticity, further to disengage the snap area (7) of the force guiding panel (3) from the circumference of the hole in the center of the CD.

However, the prior are is found with the following defects:

(1) The CD is vulnerable to distortion. Upon fetching the CD, the force guiding panel (3) when pressed is subject to inconsistent inclination to prevent the CD completely disengaged from the snap member, and any forced removal of the CD would easily distort the CD;

(2) The CD is difficult to be fetched out of the case due to limited space for transformation. Though each pair of force guiding panels (3) are separated by stripe gaps (4), very limited spacing for transformation by those force guiding panels (3) are provided due to they are interconnected to each other, thus preventing easy fetch of the CD from the case.

SUMMARY OF THE INVENTION

The primary purpose of the present invention is to provide a snapping mechanism for a CD case. Wherein, a short, conic protruding support area is provided in the CD case, and a short, cylindrical snapping member protrudes from the center of the support area, characterized by that on the top of the snapping member, a guiding concave inclining inwardly is provided and on the upper circumference of the snapping member, a conic guiding area is provided, a snapping bulge is provided beneath the conic guiding area, multiple grooves are cut at equal spacing on both of the snapping member and the support area to form elastic snapping panels on both of the snapping member and the support area as divided by the grooves with the snap ping member on each elastic snapping panel and the support area respectively connected by a trail; so that by means of the trail, the CD is first guided by the conic guiding area to the center hole of the CD, then as further pressed, the CD is firmed secured beneath the snapping bulge. Furthermore, the expanded space for transformation by the elastic snapping panels relatively increases the width of the snapping bulge to provide even better snapping effect to prevent the CD from falling off.

Another purpose of the present invention is to provide a snapping mechanism for a CD case. Wherein, the snapping member on each elastic snapping panel is connected to the support area with a trail rib to give excellent elasticity for easy transformation, and a guiding concave inclining inwardly is provided at the top of the snapping member so to meet ergonomic requirements when the guiding concave is pressed by a finger, thus to cause each elastic snapping panel to transform downwards at the same time for fetching the CD from the CD case.

BRIEF DESCRIPTION OF THE DRAWINGS

FIG. 7 is a sectional view showing the snapping mechanism of the second preferred embodiment of the present invention.

DETAILED DESCRIPTION OF THE PREFERRED EMBODIMENTS

Figure 1:
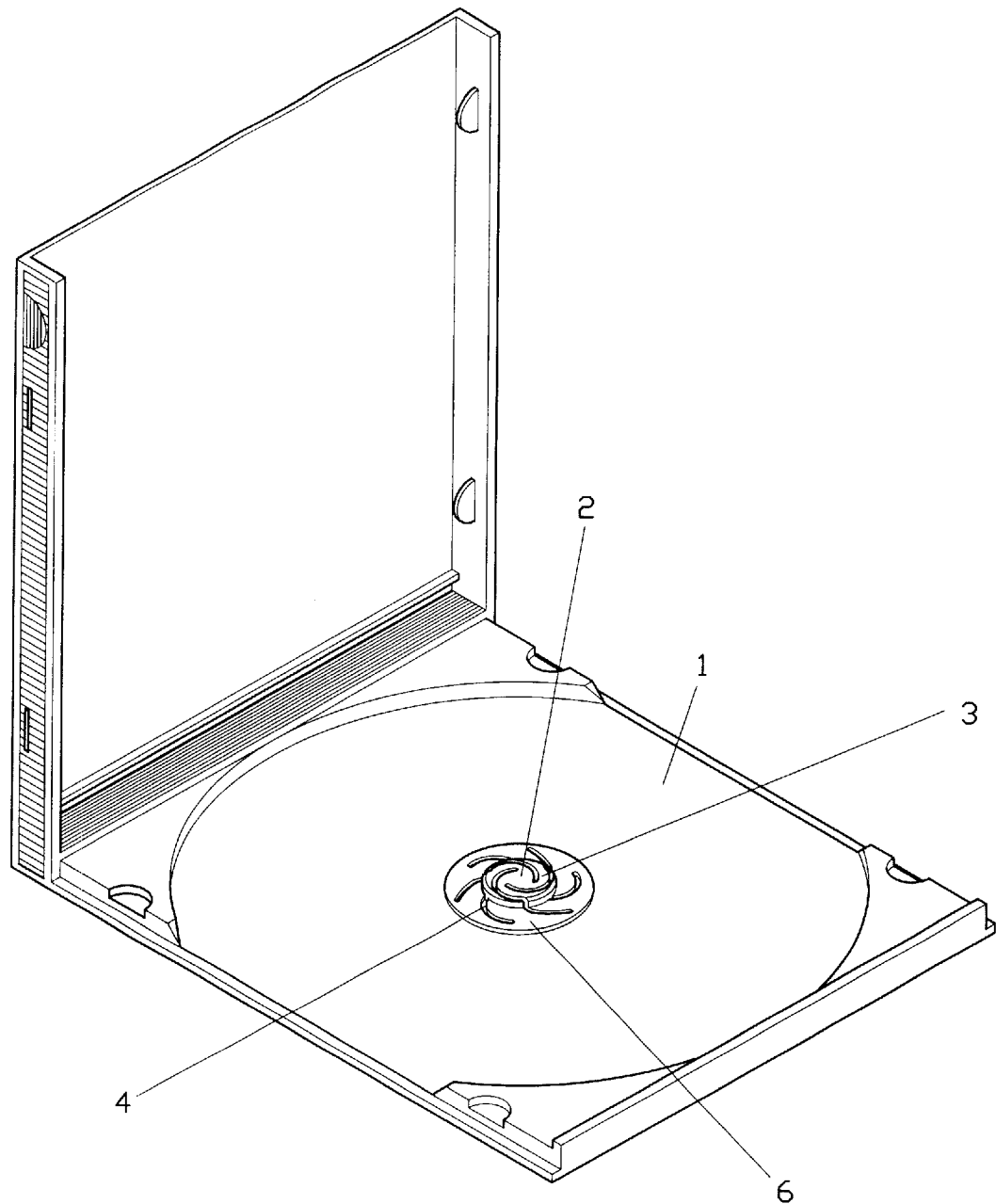
FIG. 1 is a perspective view of a prior art.
Figure 1A:
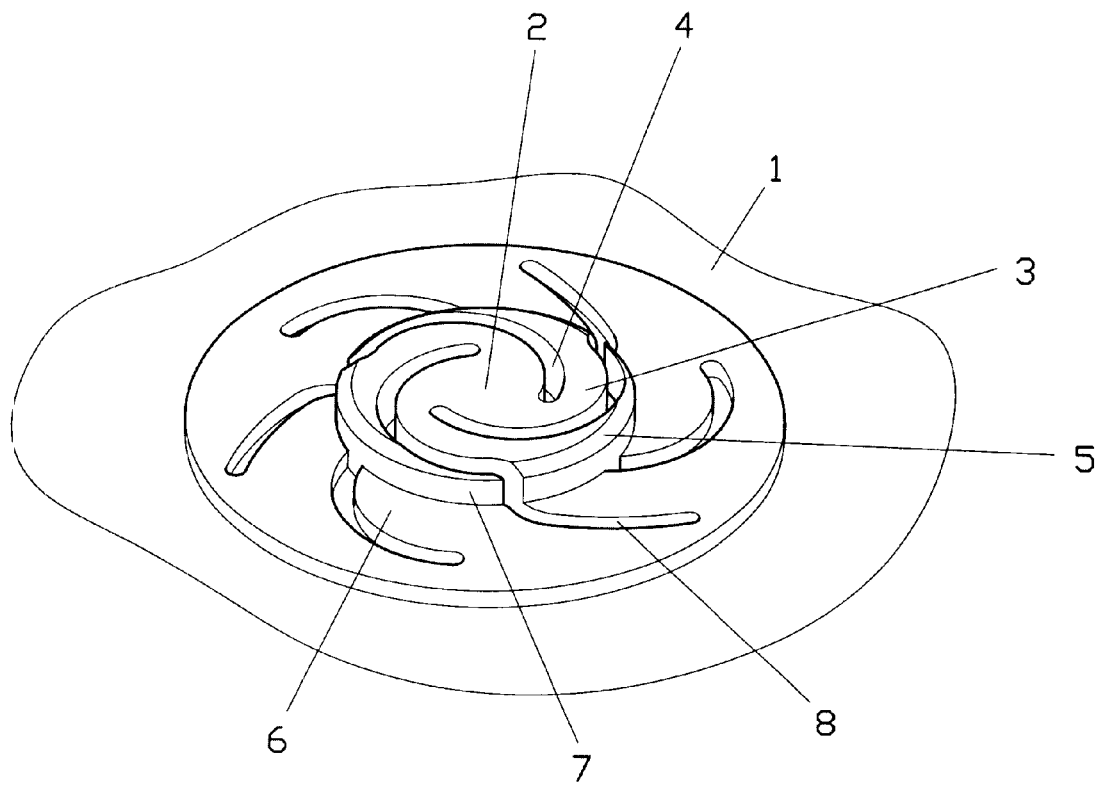
FIG. 1A is an enlarged view of a snapping mechanism in the CD case of the prior art.
Figure 2:
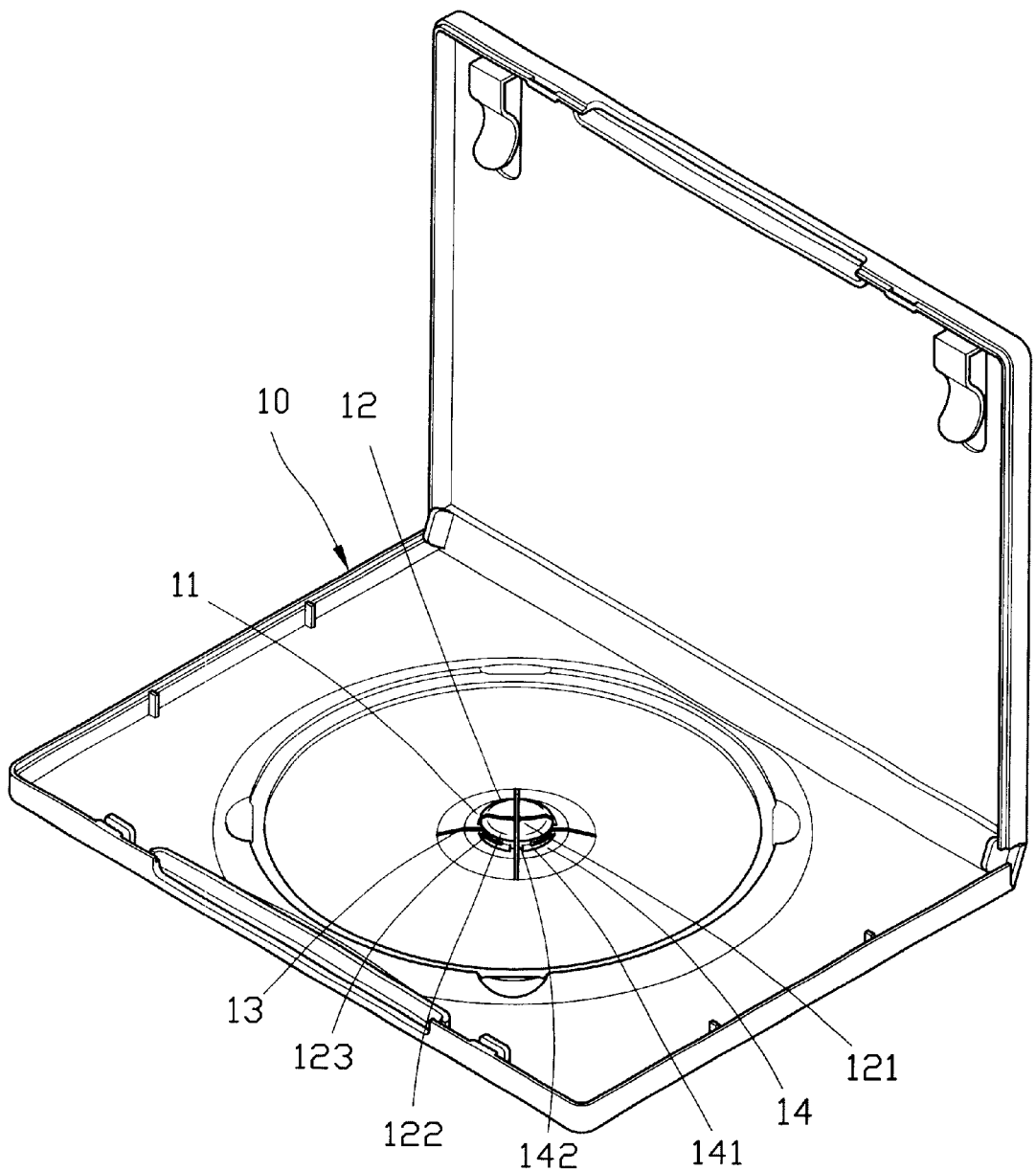
FIG. 2 is a perspective view of a preferred embodiment of the present invention.
Figure 2A:
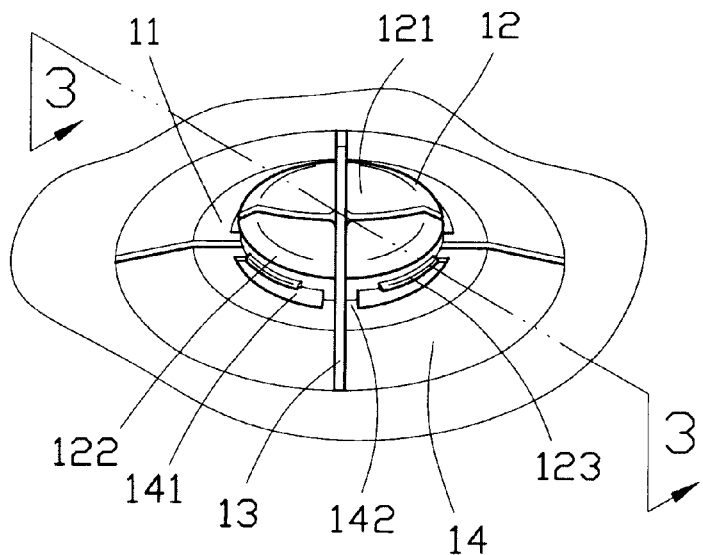
FIG. 2A is an enlarged view showing a snapping mechanism of the preferred embodiment of the present invention.
Figure 2B:
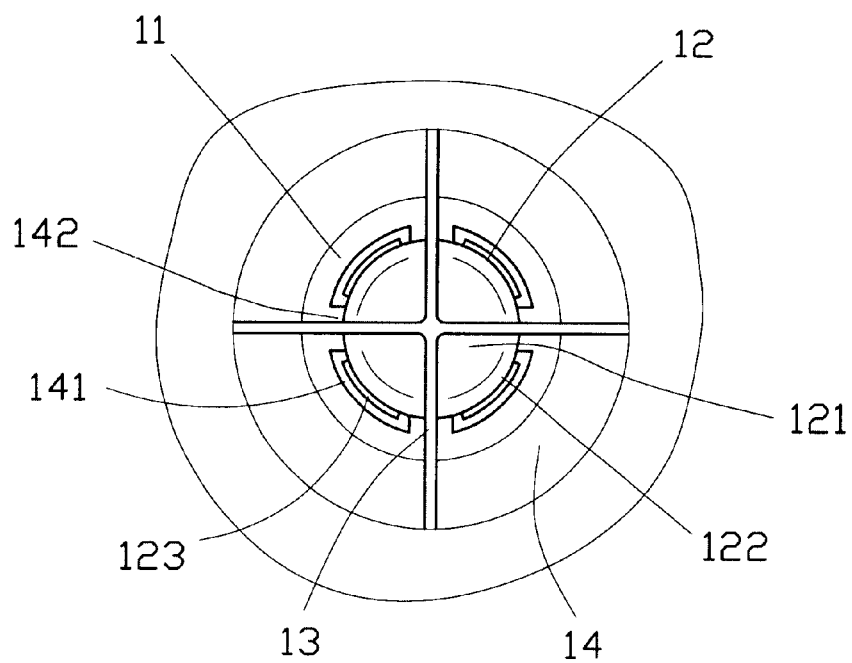
FIG. 2B is a top view of FIG. 2A.
Figure 3:
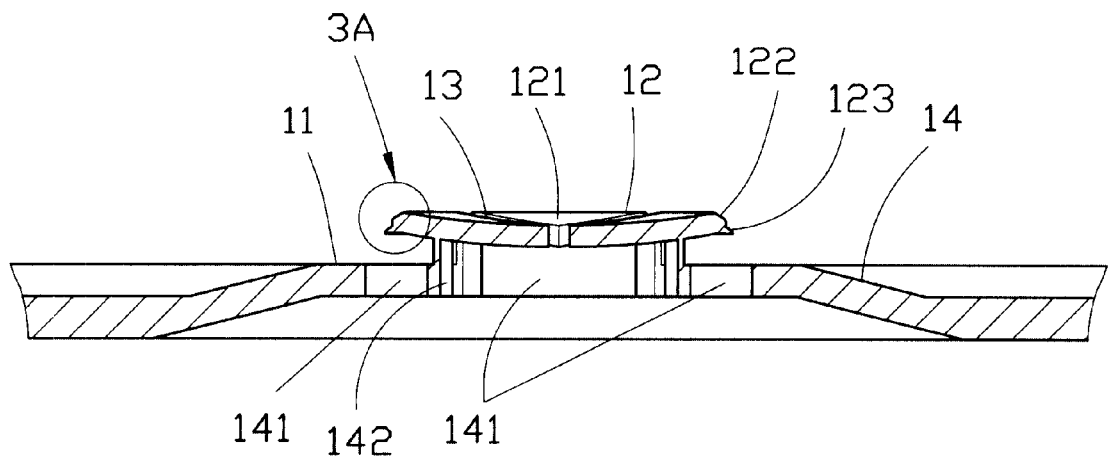
FIG. 3 is a sectional view showing the snapping mechanism of the preferred embodiment of the present invention.
Figure 3A:
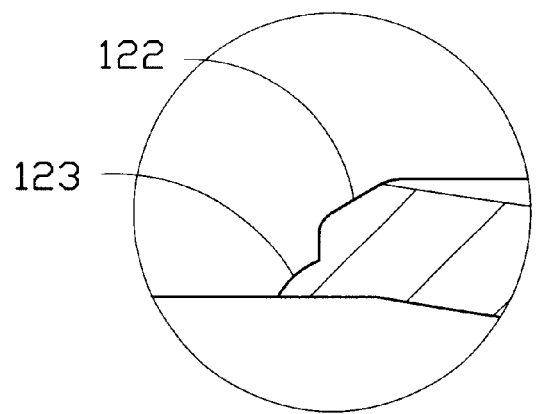
FIG. 3A is an enlarged view of a circle 3A of FIG. 3

Referring to FIGS. 2, 2A, 2B, 3 and 3A of the accompanying drawings, a short, conic support area (11) protrudes in a CD case (10), a short, cylindrical snapping member (12) further protrudes from the center of said short conic support area (11). A guiding concave (121) inclining inwardly is provided on the top of the snapping member (12), and a conic guiding area (122) is provided on the upper circumference of the snapping member (12). A snapping bulge (123) having a rounded upper end is each provided beneath the conic guiding area (122). Both of the snapping member

(12) and the support area (11) are each cut at equal spacing a cross groove (13) extending down to the edge of the support area (11) with both of the snapping member (12) and the support area (11) respectively cut into four elastic snapping panels (14) by the groove (13). A hollow channel (141) is each provided at where each the elastic snapping panel (14) joins the support area (11) with the snapping member (12) of each elastic snapping panel (14) connected only by two trail ribs (142).

Figure 4:
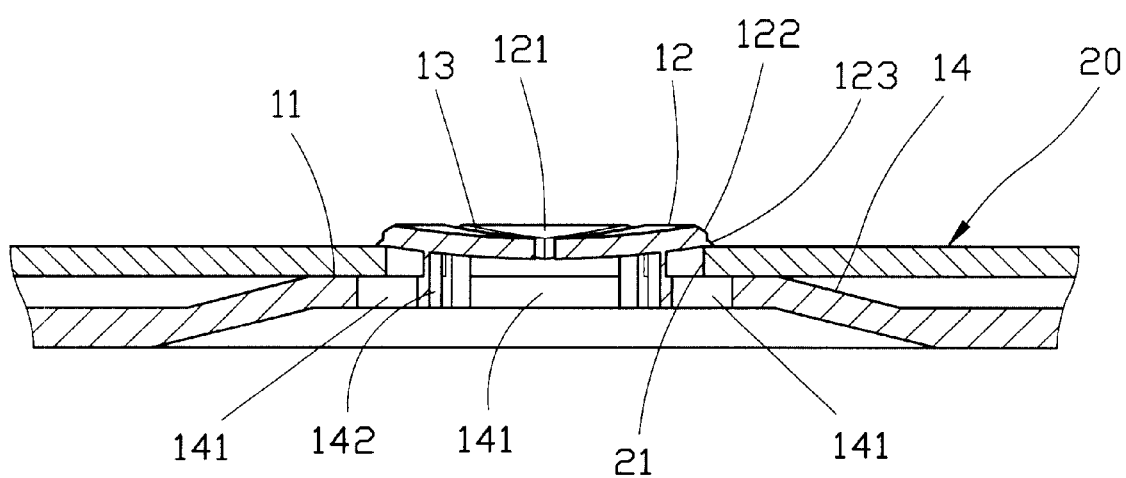
FIG. 4 is a sectional view showing placement of a CD into the preferred embodiment of the present invention.

Upon placing a CD (20) is first in the CD case (10) as illustrated in FIG. 4, a center hole (21) of the CD (20) slides first onto the upper side of the snapping bulge (123) as guided by the conic guiding area (122), then as the CD (20) is continuously pressed, it is secured in position by the snapping bulge (123).

Figure 5:
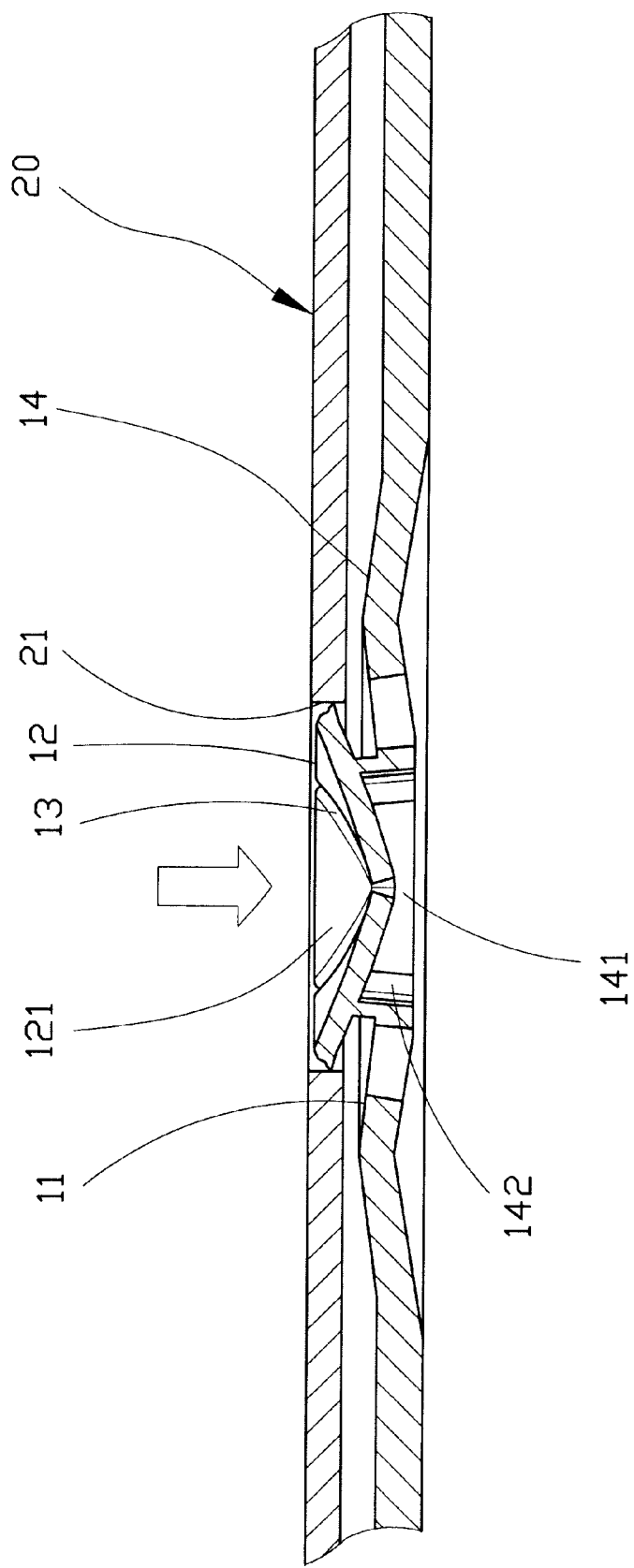
FIG. 5 is a sectional view showing the snapping mechanism of the preferred embodiment of the present invention is pressed for fetching the CD out of the case.
Figure 6:
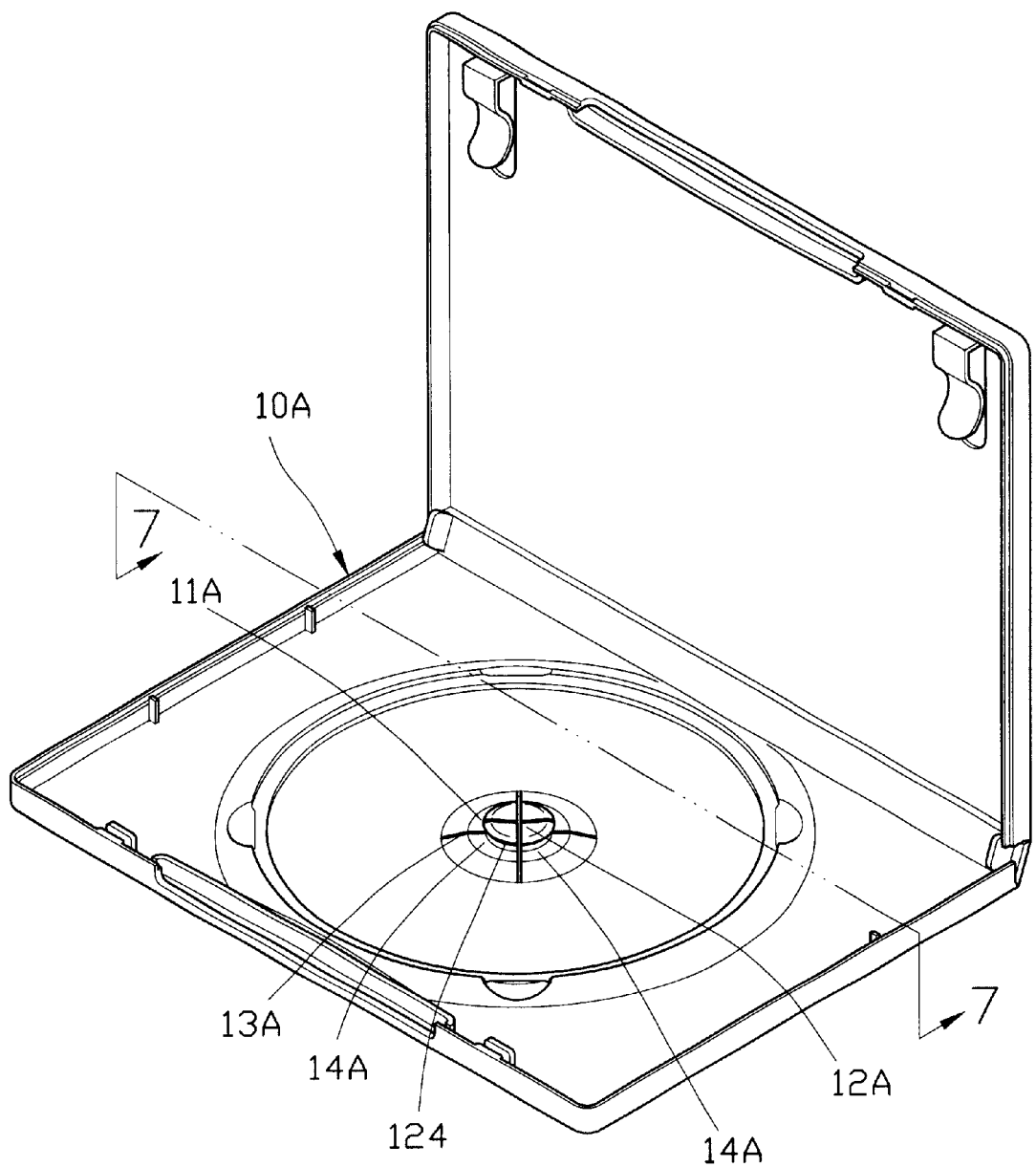
FIG. 6 is a perspective view showing a second preferred embodiment of the present invention.
Figure 6A:
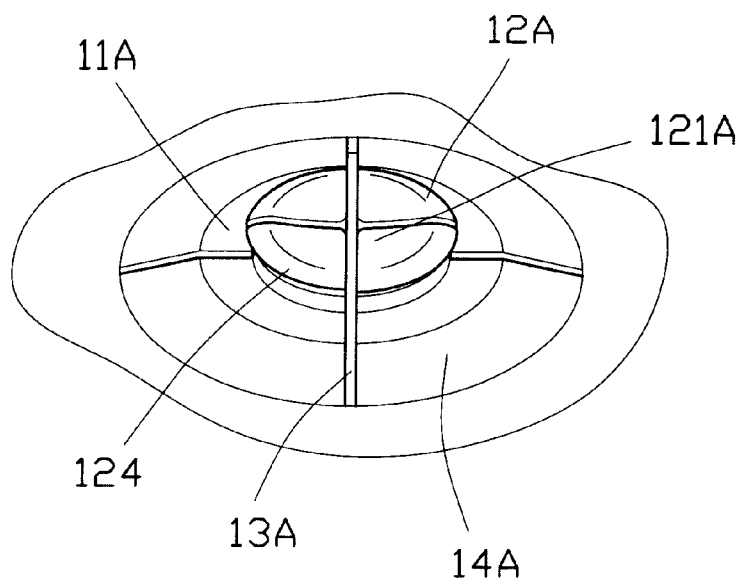
FIG. 6A is an enlarged view showing a snapping mechanism in the second preferred embodiment of the present invention.
Figure 6B:
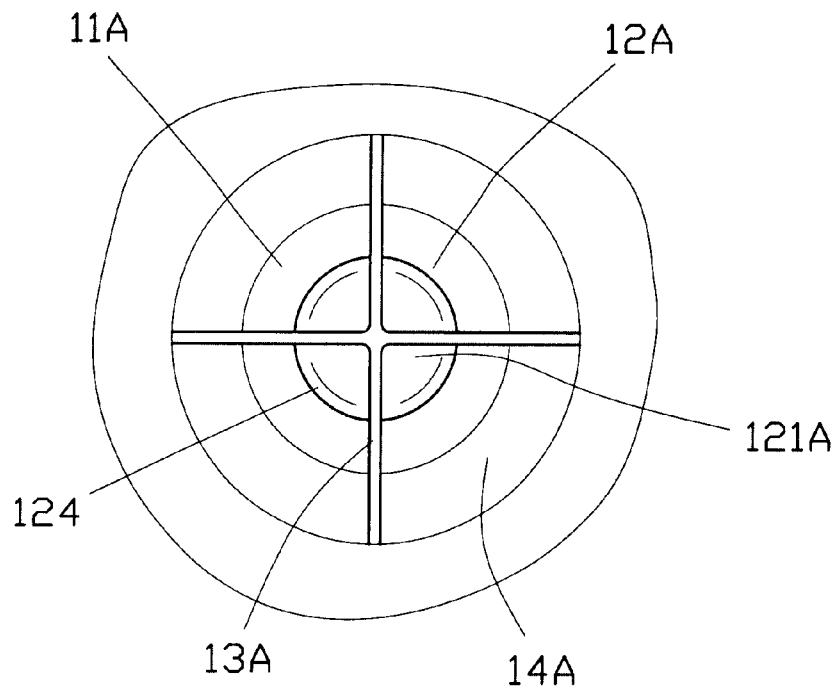
FIG. 6B is a top view of FIG. 6A.

Upon fetching the CD (20) as illustrated in FIG. 5, the guiding concave (121) provided on the top of the snapping member (12) is pressed by a finger to cause all the snapping panels (14) to execute elastic transformation downward synchronously to completely disengage the snapping bulge (123) of the snapping member (12) from the circumference of the central hole (21) of the CD (20) thus to easily lift and take the CD (20) from its case.

In a second preferred embodiment of the present invention as illustrated in FIGS. 6, 6A, 6B and 7, a short, conic support area (11A) protrudes in a CD case (10A), and a short cylindrical snapping member (12A) in a proper height further protrudes from the center of the support area (11A). A guiding concave (121A) inclining inwardly is provided on top of the snapping member (12A), and a snapping flange (124) is separately provided on the upper section of the circumference of the snapping member (12A). A cross groove (13A) is cut at equal spacing on both of the snapping member (12A) and the support area (11A) extending further to the edge of the support area (11A) so that both of the snapping member (12A) and the support area (11A) are separated into four elastic snapping panels (14A) as divided by the cross groove (13A).

As executed by said preferred embodiments as disclosed above, the present invention achieves the following benefits:

(1) Upon placing the CD (20) into the case, it can be first forthwith directed by the conic guiding area (122) for the central hole (21) of the CD (20) to be positioned in the upper side of the snapping bulge (123), and then firmly secured below the snapping bulge (123) as the CD (20) is continuously pressed while the extended space for transformation by the elastic snapping panel (14) relatively increases the width of the snapping bulge (123) to provide even more consistent snapping to prevent the CD (20) from falling off.

(2) Easy transformation and excellent elasticity since the snapping member (12) on each elastic snapping panel (14) is connected to the support area (11) with the trail rib (142); furthermore, the guiding concave (121) inclining inwardly provided on top of the snapping member (12) meets ergonomic requirements for the finger to press upon it, thus to cause all individual elastic snapping panels (14) to transform downward and synchronously for each fetching of the CD (20) out of its case.

I claim:

1. A snapping mechanism of a CD case comprised of a short, conic support area protruding from the bottom of the case, and a short, cylindrical snapping member protruding from the center of said support area characterized by that:

a guiding concave inclining inwardly provided on the top of said snapping member, a conic guiding area provided on the upper side to the circumference of said snapping member, a snapping bulge provided beneath said conic guiding area, both of said snapping member and said support area being cut by multiple grooves at equal spacing for both of said snapping member and said support area being segregated by said grooves into multiple elastic snapping panels and trail ribs provided to connect said support area and said snapping member on each said elastic snapping panel.

2. A snapping mechanism of a CD case as claimed in claim 1, wherein, the upper end of said snapping bulge is rounded.

3. A snapping mechanism of a CD case as claimed in claim 1, wherein, a snapping flange is directly provided to the upper side of the circumference of said snapping member.

4. A snapping mechanism of a CD case as claimed in claim 1, wherein, a hollow channel is respectively provided to each said elastic snapping panel at where said snapping member joins said support area.

* * * * *